United States Patent
Meyer, III

(10) Patent No.: US 11,482,923 B1
(45) Date of Patent: Oct. 25, 2022

(54) PULSE-WIDTH MODULATION SCHEME FOR MANAGING THERMAL LOADING OF AN INVERTER DURING STALL

(71) Applicant: Delphi Technologies IP Limited, St. Michael (BB)

(72) Inventor: John William Meyer, III, McCordsville, IN (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 17/389,867

(22) Filed: Jul. 30, 2021

(51) Int. Cl.
*H02M 1/32* (2007.01)
*H02P 27/14* (2006.01)

(52) U.S. Cl.
CPC ............ *H02M 1/327* (2021.05); *H02P 27/14* (2013.01)

(58) Field of Classification Search
CPC .............................. H02M 1/327; H02P 27/14
USPC ......................................................... 327/512
See application file for complete search history.

(56) References Cited

U.S. PATENT DOCUMENTS

| 2002/0044472 | A1 | 4/2002 | Arnet et al. |
| 2020/0313593 | A1 | 10/2020 | Schulz |
| 2021/0203257 | A1* | 7/2021 | Lakshmi Narasimha ................... H02P 6/183 |

* cited by examiner

*Primary Examiner* — Tomi Skibinski
(74) *Attorney, Agent, or Firm* — Joshua M. Haines; Bookoff McAndrews, PLLC

(57) ABSTRACT

A system includes a controller for a DC to AC inverter including a processor configured to execute instructions to perform operations including: generating a first pulse for a first phase of a center-aligned PWM signal to alternately activate a first phase switch of a first switch group of the inverter for a first duration and a first phase switch of a second switch group of the inverter for a second duration within a period of the PWM signal; and generating a second pulse for a second phase of the PWM signal to alternately activate a second phase switch of the first switch group of the inverter for a third duration and a second phase switch of the second switch group of the inverter for a fourth duration within the period of the PWM signal, wherein the second duration is different from the third duration during a stall condition.

20 Claims, 10 Drawing Sheets

PULSE-WIDTH MODULATION SCHEME FOR MANAGING THERMAL LOADING OF AN INVERTER DURING STALL

TECHNICAL FIELD

Various embodiments of the present disclosure relate generally to managing thermal loading of an inverter during a stall condition and, more particularly, to using a pulse-width modulation scheme during a stall condition of the inverter to reduce a maximum heat flux in any one device of the inverter.

BACKGROUND

During a motor stall, a motor slows and stops rotating even though the motor receives sufficient power. Stall occurs when the torque required by a load to the motor is more than the maximum torque that the motor can generate or is commanded to generate. The thermal dissipation that occurs in an inverter during a low speed condition and/or stall (motor at zero Revolutions per Minute (RPM) for a synchronous machine, or at the slip speed in motoring for asynchronous machines) condition leads to highly asymmetric loading in the inverter power devices. Without appropriate mitigation, temperatures can rise quickly enough to cause damage. In addition, this asymmetric loading can cause typical temperature measurement techniques to underestimate the true temperature of the highest stressed devices.

Conventional solutions for mitigating this condition include several techniques. For example, output current and/or torque may be reduced to decrease power loss of the inverter or a device junction temperature estimator may be implemented to attempt to predict the rise in temperature that can no longer accurately be measured. Another solution is to adjust the pulse-width modulation (PWM) scheme by using a discontinuous PWM/least switch highest current algorithm, using a zero vector select, or reducing the PWM frequency. Another conventional solution is to alter the fundamental frequency to avoid stall conditions and run at a non-ideal slip speed (which is only applicable to asynchronous machines). Finally, another solution is to implement a maximum time in stall, after which performance is reduced or operation is stopped.

These solutions all attempt to manage the total energy dissipated during stall, either by reducing the power dissipation or by reducing the time that peak loss can occur. However, these solutions are not universally applicable to all types of inverters or systems. In particular, an inverter system which has a loss profile that is highly based on the conduction losses may have lower losses when implementing a discontinuous PWM strategy, but the losses may be more highly concentrated in certain devices. This leads to higher heat flux and lower performance at or near stall.

The present disclosure is directed to overcoming one or more of these above-referenced challenges.

SUMMARY OF THE DISCLOSURE

According to certain aspects of the disclosure, a system includes a controller for a direct-current (DC) to alternating current (AC) inverter including: a memory configured to store instructions; and at least one processor configured to execute the stored instructions to perform operations including: generating a first pulse for a first phase of a Pulse-Width Modulated (PWM) signal to alternately activate a first phase switch of a first switch group of the inverter for a first duration and a first phase switch of a second switch group of the inverter for a second duration within a period of the PWM signal to generate a first phase of AC power; and generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power, wherein the second pulse is center-aligned with the first pulse, and wherein the second duration is different from the third duration during a stall condition.

According to certain aspects of the disclosure, a method for controlling a direct-current (DC) to alternating current (AC) inverter includes performing, by at least one processor, operations including: generating a first pulse for a first phase of a Pulse-Width Modulated (PWM) signal to alternately activate a first phase switch of a first switch group of the inverter for a first duration and a first phase switch of a second switch group of the inverter for a second duration within a period of the PWM signal to generate a first phase of AC power; and generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power, wherein the second pulse is center-aligned with the first pulse, and wherein the second duration is different from the third duration during a stall condition.

According to certain aspects of the disclosure, a non-transitory computer readable medium storing instructions that, when executed by at least one processor, perform operations including: generating a first pulse for a first phase of a Pulse-Width Modulated (PWM) signal to alternately activate a first phase switch of a first switch group of an inverter for a first duration and a first phase switch of a second switch group of the inverter for a second duration within a period of the PWM signal to generate a first phase of AC power; and generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power, wherein the second pulse is center-aligned with the first pulse, and wherein the second duration is different from the third duration during a stall condition.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
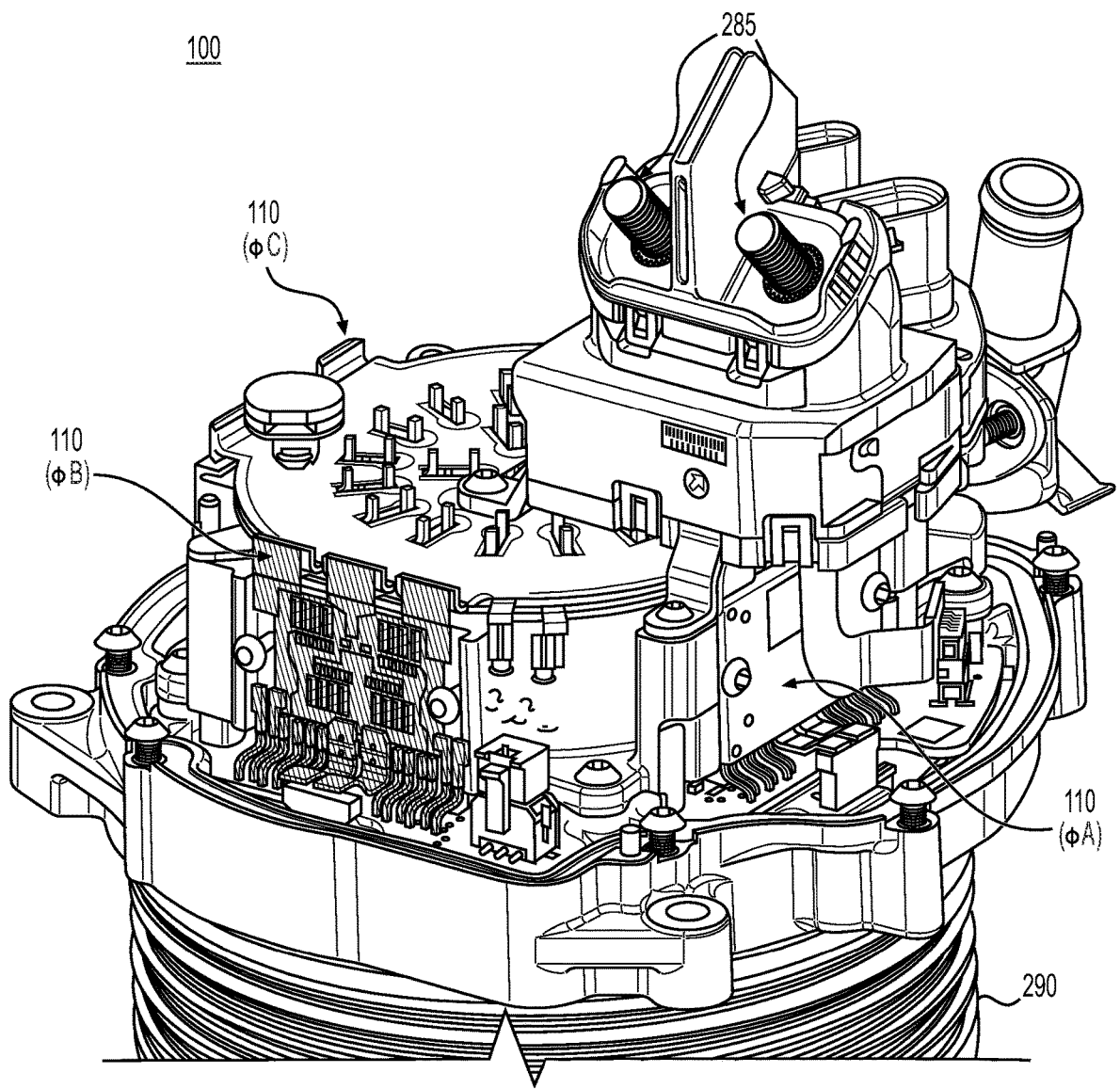
FIG. 1 depicts a three phase inverter module, according to one or more embodiments.

Various embodiments of the present disclosure relate generally to managing thermal loading of an inverter during a stall condition and, more particularly, to using a pulse-width modulation scheme during a stall condition of the inverter to reduce a maximum heat flux in any one device of the inverter by altering a 50% duty cycle. The resulting lower heat flux lowers the rate of rise and the final temperature, thus increasing time in stall that maximum torque can be continuously applied.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices Q1-Q6 may be described as switches or devices, but may refer to any device capable of controlling the flow of power in an electrical circuit. For example, devices Q1-Q6 may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Aspects of the present disclosure tailor operation of an inverter at stall and/or low speed conditions to reduce the maximum heat flux in devices in a first three-phase device group and a second three-phase device group, while simultaneously maintaining the same aggregate losses across the inverter (with no net increase in losses, and possibly a slight decrease due to second order effects). Because of the lower heat flux, the duration of full performance operation in stall condition may be extended. An aspect of the present disclosure is not necessarily to lower the overall losses in an inverter at or near stall, but instead to achieve the lowest overall maximum heat flux in the highest loaded devices by tailored PWM switching.

Inverter systems that convert DC power to a single or polyphase AC power (either unidirectionally or bidirectionally) create losses (waste heat) as a byproduct of the inefficiencies of the power conversion. This waste heat is removed by the thermal management system, which may include a heatsink that may use forced or free convection to a cooling fluid (air, water, water ethylene glycol, or other).

The losses can be divided into two bulk categories, and shown to be a strong function of (1) conduction losses including drain-source on resistance ($RDS_{ON}$) or forward voltage ($V_F$) of device, load current, and conduction time/duty cycle and (2) switching losses including load current, load current direction (allows half the devices to undergo "soft switching"), PWM frequency, and DC link voltage.

As losses are a function of load current, and that load current is typically sinusoidal in nature in AC systems, the loss function will also be sinusoidal. At speed, the peaks in the sinusoidal loss curve are mitigated by their short duration and thermal capacity of the thermal management system. At stall, the peak value is held indefinitely, resulting in average heat fluxes well above typical higher speed conditions. These points typically are untenable for inverter systems and the devices must be made larger/more robust or the performance must be reduced to reduce losses.

The losses at stall are highly asymmetric (not equal among devices in the inverter) and hence cause uneven heating, potentially to the point of damage to the inverter. The asymmetric losses can cause issues with traditional temperature measurement techniques, leading to an underestimation of the true device temperature.

Some prior solutions measure device temperature and reduce torque (output current) to prevent temperature rise outside of a safe operating area. However, temperature measurement often fails to detect true peak temperature due to high thermal gradients, and provides no increase in performance.

Some prior solutions reduce output current/torque to decrease power loss. However, this results in a loss of system performance without regard to true need for reduction.

Some prior solutions implement a device junction temperature estimator to attempt to predict the rise in temperature that can no longer accurately be measured. However, this results in no increase in performance.

Some prior solutions adjust PWM scheme by using a Discontinuous PWM/least switch highest current algorithm/Zero Vector select. However, in systems with low switching to conduction loss ratio, this may actually decrease performance as the increased heat flux in the conducting devices (from application of a 100% duty cycle) may not be compensated by the commensurate reduction in total losses (from removal of switching losses in one phase).

Some prior solutions adjust PWM scheme by reducing PWM frequency. However, this prior solution does not have a deficiency that aspects of the present disclosure mitigates.

Although only applicable to asynchronous machines, some prior solutions alter the fundamental frequency to avoid stall conditions and run at a non-ideal slip speed. However, this is not applicable to all systems, and results in reduced torque. Some prior solutions implement a maximum time in stall, after which performance is reduced or operation stopped. However, this reduces performance to a worst case stall time under all conditions, and provides no increase in performance.

Figure 4:
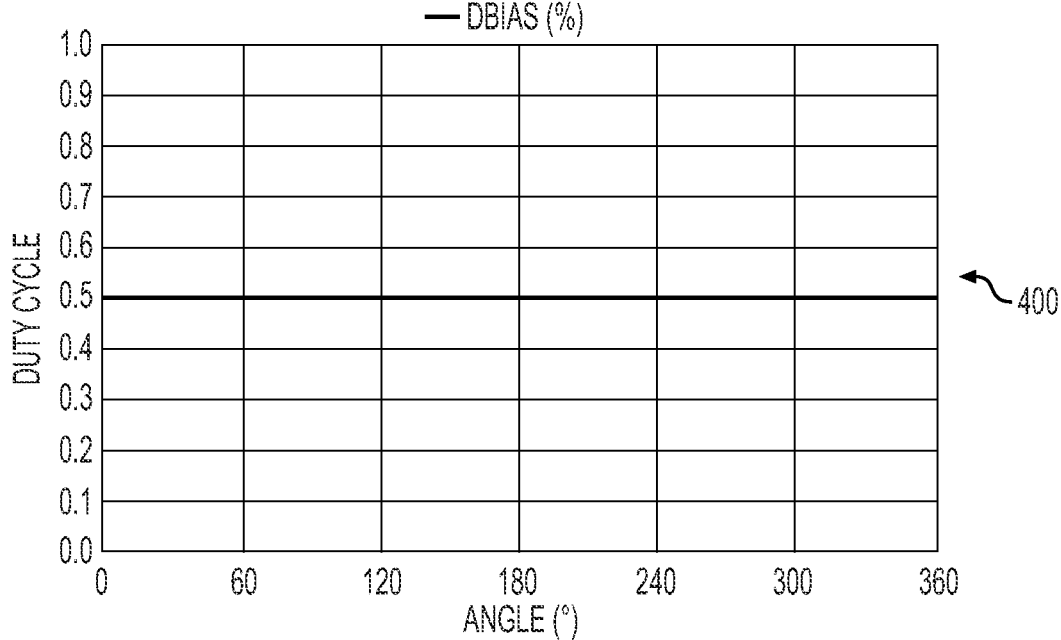
FIG. 4 depicts a duty cycle bias versus angle for a period of a stall condition PWM scheme with 50% null vector modulation, according to one or more embodiments.

Aspects of the present disclosure alter the 50% duty cycle (for example, as shown in FIG. 4) to lower the conduction losses in the highest loaded device among devices in a first three-phase device group and a second three-phase device group. Therefore, the losses are shifted to other devices among devices in a first three-phase device group and a second three-phase device group, so no reduction in total losses is realized when assuming first order effects only. A small reduction in losses may result from lower conduction losses as a result of lower temperatures (second order effect). Lower temperature leads to lower $R_{DSON}$ (which is typically a PTC correlation).

The resulting lower heat flux lowers the rate of rise of a temperature of devices in the inverter and the final temperature of devices in the inverter, thus increasing time in stall that maximum torque can be continuously applied. Switching losses remain unchanged, and conduction losses are altered to make total losses approximately identical between low and high side devices of the highest loaded phase (see FIG. 13). Conduction losses are altered by altering the ratio of low side null vector to high side null vector away from 50%. The alteration of the 50% level can be achieved (and even tailored) for the inverter system's specific design.

Figure 2:
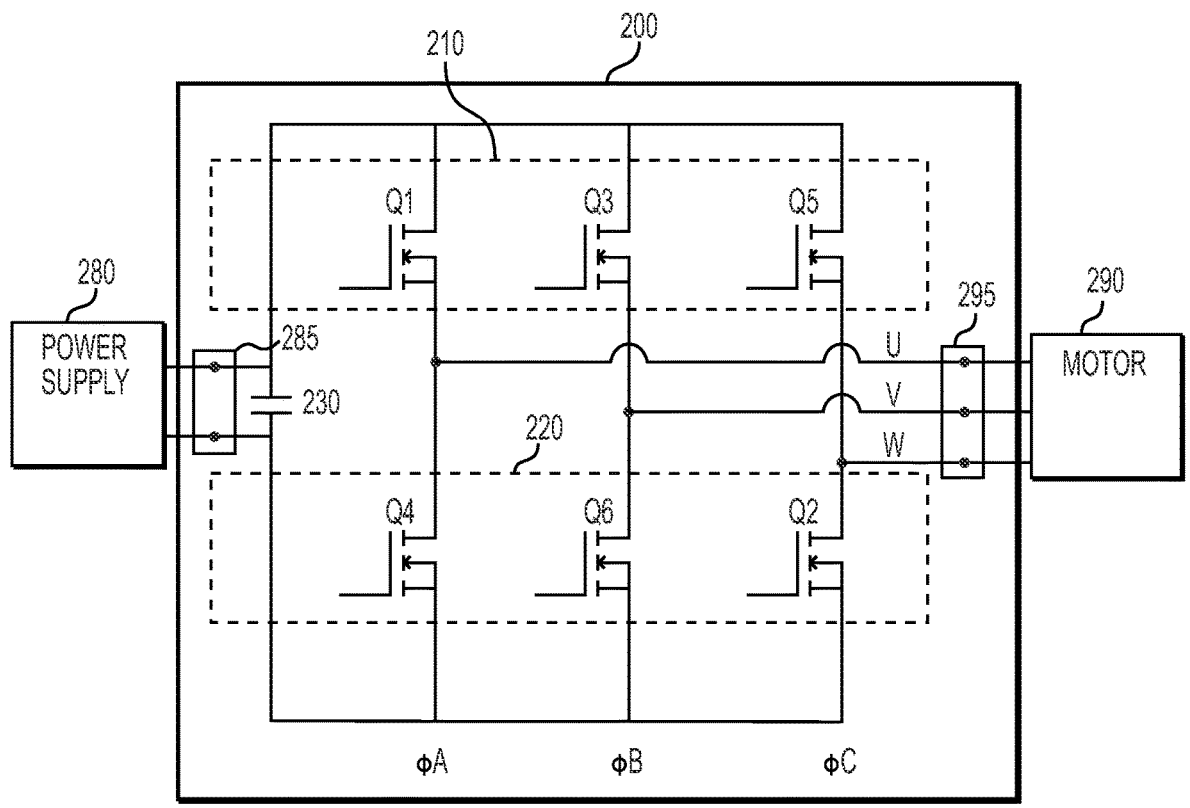
FIG. 2 depicts an electrical power schematic of a three phase inverter module in a connected system, according to one or more embodiments.

FIG. 1 depicts a three phase inverter module, according to one or more embodiments. FIG. 2 depicts an electrical power schematic of a three phase inverter module, according to one or more embodiments.

As shown in FIGS. 1 and 2, a three phase inverter module 100 may include heat sink 110 and power circuit 200, and may be connected to a power supply 280 and a motor 290. Power circuit 200 may include first three-phase switch group 210, and second three-phase switch group 220. A first phase U may correlate with ΦA including switches Q1 and Q4, a second phase V may correlate with ΦB including switches Q3 and Q6, and a third phase W may correlate with ΦC including switches Q5 and Q2, as illustrated in FIG. 2. First three-phase switch group 210 may include first phase switch Q1, second phase switch Q3, and third phase switch Q5. Second three-phase switch group 220 may include first phase switch Q4, second phase switch Q6, and third phase switch Q2. Switches Q1-Q6 may be metal-oxide-semiconductor field-effect transistors (MOSFET), for example, but are not limited thereto.

The first three-phase switch group 210 and second three-phase switch group 220 may be driven by a PWM signal (as illustrated, for example, in FIGS. 8, 9, 10, and 11) generated by inverter controller 300 to convert DC power delivered via input terminal set 285 at capacitor 230 to three phase AC power at outputs U, V, and W via output terminal set 295 to motor 290. Additionally, although FIGS. 1 and 2 illustrate a three-phase inverter, the disclosure is not limited thereto, and may include single phase or multi-phase inverters.

Figure 3:
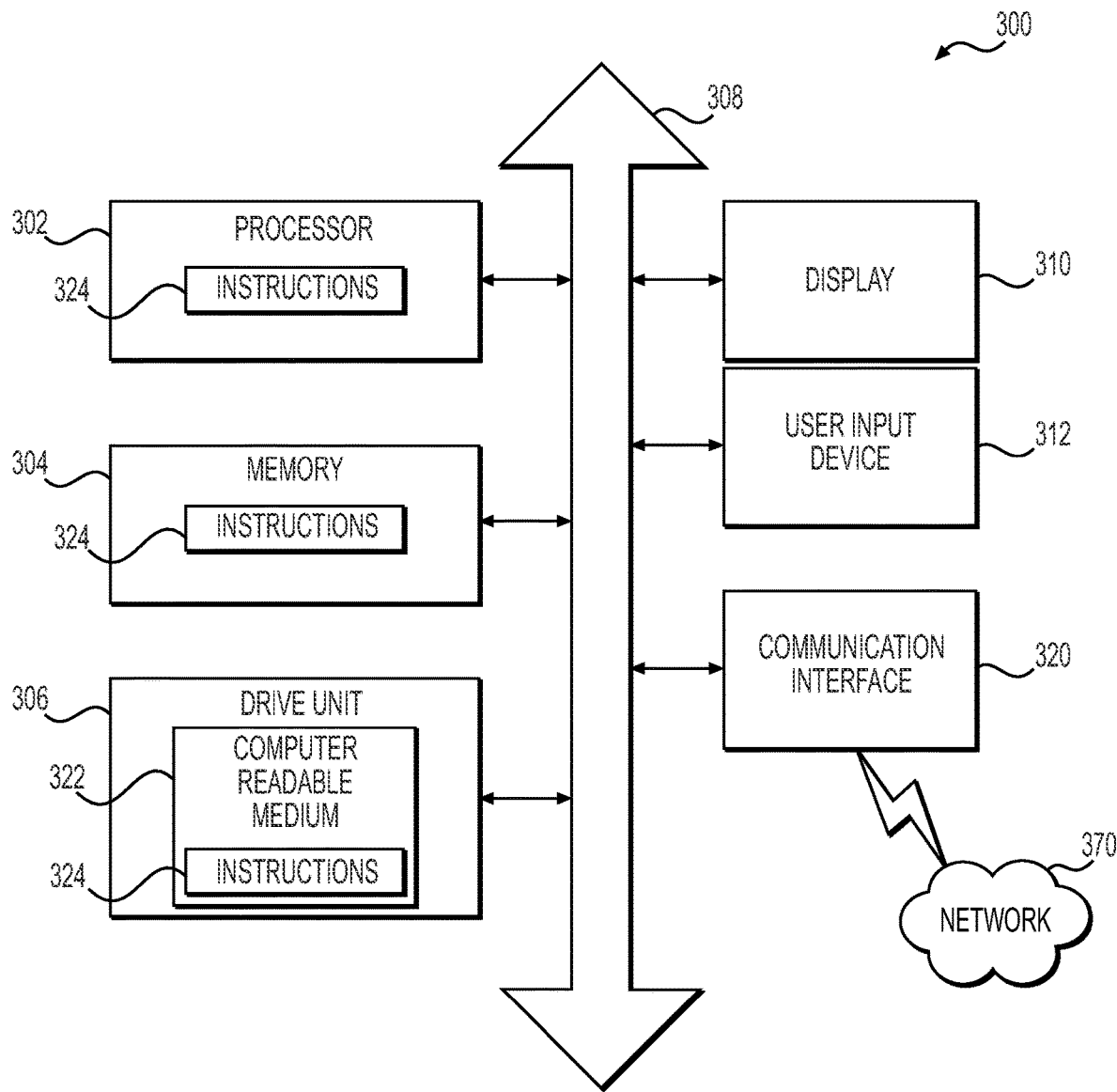
FIG. 3 depicts an implementation of a computer system that may execute techniques presented herein, according to one or more embodiments.

FIG. 3 depicts an implementation of an inverter controller 300 that may execute techniques presented herein, according to one or more embodiments.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As illustrated in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

FIG. 4 depicts a duty cycle bias versus angle for a period of a stall condition PWM scheme with 50% null vector modulation, according to one or more embodiments. The duty cycle bias is the percentage of the total null vector time applied to the center of the PWM period. As shown in FIG. 4, the duty cycle bias 400 for a stall condition PWM scheme with 50% null vector modulation remains targeted at a constant of 50% as an angle varies from 0 degrees to 360 degrees.

Figure 5:
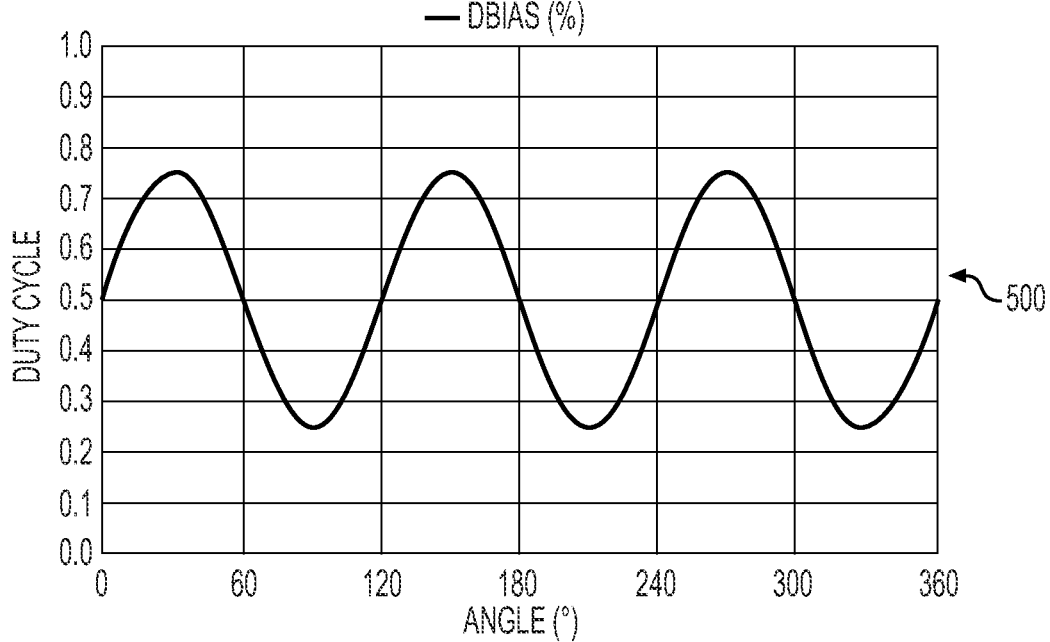
FIG. 5 depicts a duty cycle bias versus angle for a period of a stall condition PWM scheme with 25% third harmonic null vector modulation, according to one or more embodiments.

FIG. 5 depicts a duty cycle bias versus angle for a period of a stall condition PWM scheme with 25% third harmonic null vector modulation, according to one or more embodiments. Similarly to FIG. 4, FIG. 5 depicts the percentage of total null vector time applied to the center of the PWM period. As shown in FIG. 5, the duty cycle bias 500 for a stall condition PWM scheme with 25% third harmonic null vector modulation varies from approximately 25% to approximately 75% in a sinusoidal waveform as an angle varies from 0 degrees to 360 degrees. However, the disclosure is not limited to the waveform illustrated in FIG. 5, which is merely an example, and other variable waveforms may be used to vary the duty cycle as an angle varies from 0 degrees to 360 degrees. For example, for a particular system, 25.4% as a lower limit may result in a near match of the peak power in two devices of one phase at that phase's peak power. However, other systems may be slightly different. At an inflection point, a 50/50 split of power between two devices in a phase starts to swing in an opposite direction, with a previously lowest loaded device's power exceeding the previously highest loading device's power. Accordingly, an inflection point exists where additional injection of a third harmonic results in larger asymmetry (instead of greater symmetry) in heat flux, whereby the ratio of power determines the limit. This optimum ratio of power is system dependent, relating to the proportion of switching losses to conduction losses.

Figure 6:
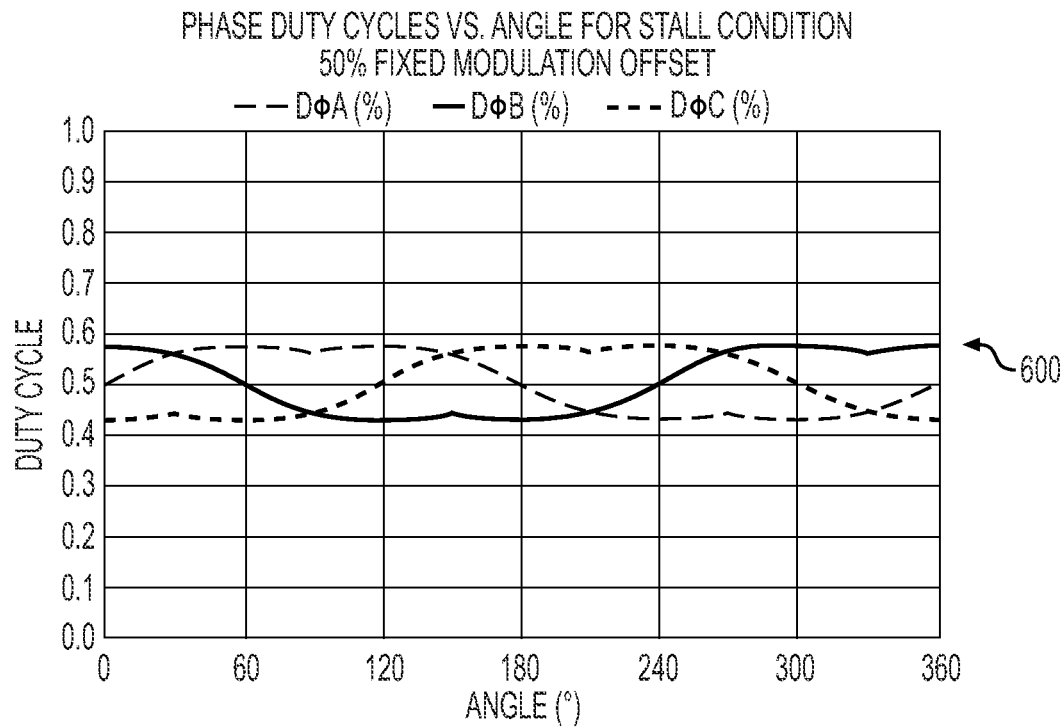
FIG. 6 depicts a phase duty cycle versus angle for a period of a stall condition PWM scheme with 50% null vector modulation, according to one or more embodiments.

FIG. 6 depicts a phase duty cycle 600 versus angle for a period of a stall condition PWM scheme with 50% null vector modulation, according to one or more embodiments. The phase duty cycle describes the percentage of time the corresponding high side devices (first three-phase switch group 210) are commanded to be switched on.

Figure 7:
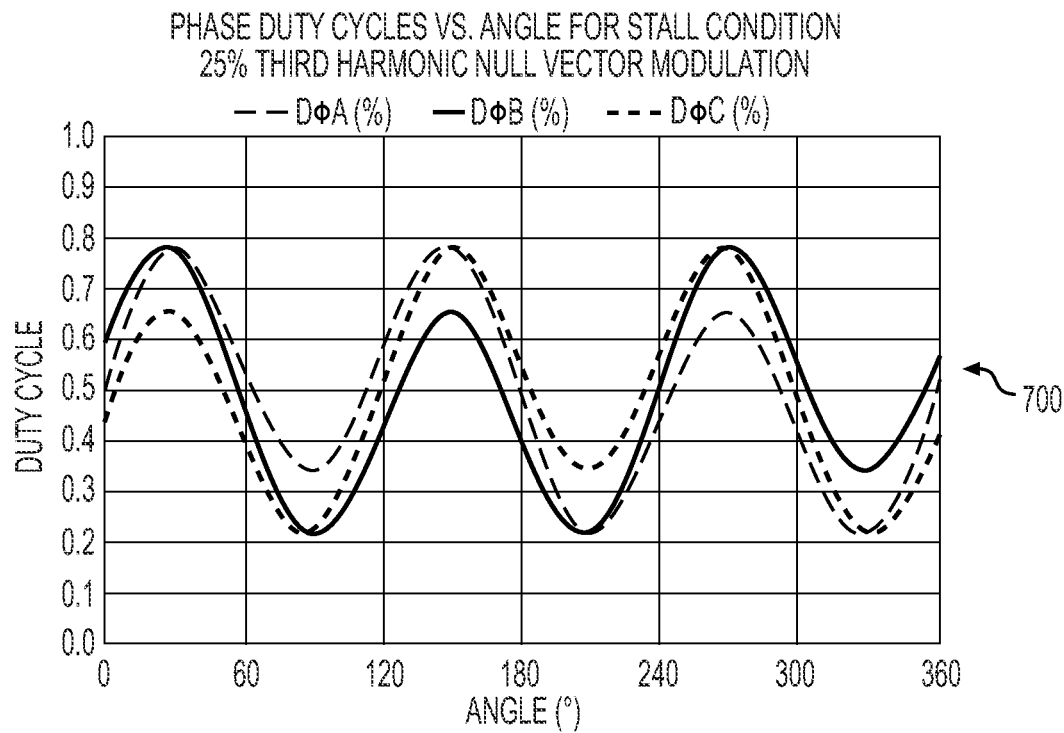
FIG. 7 depicts a phase duty cycle versus angle for a period of a stall condition PWM scheme with 25% third harmonic null vector modulation, according to one or more embodiments.

FIG. 7 depicts a phase duty cycle 700 versus angle for a period of a stall condition PWM scheme with 25% third harmonic null vector modulation, according to one or more embodiments. Similarly to FIG. 6, FIG. 7 describes the percentage of time the corresponding high side devices (the first three-phase switch group 210) are commanded to be switched on.

Figure 8:
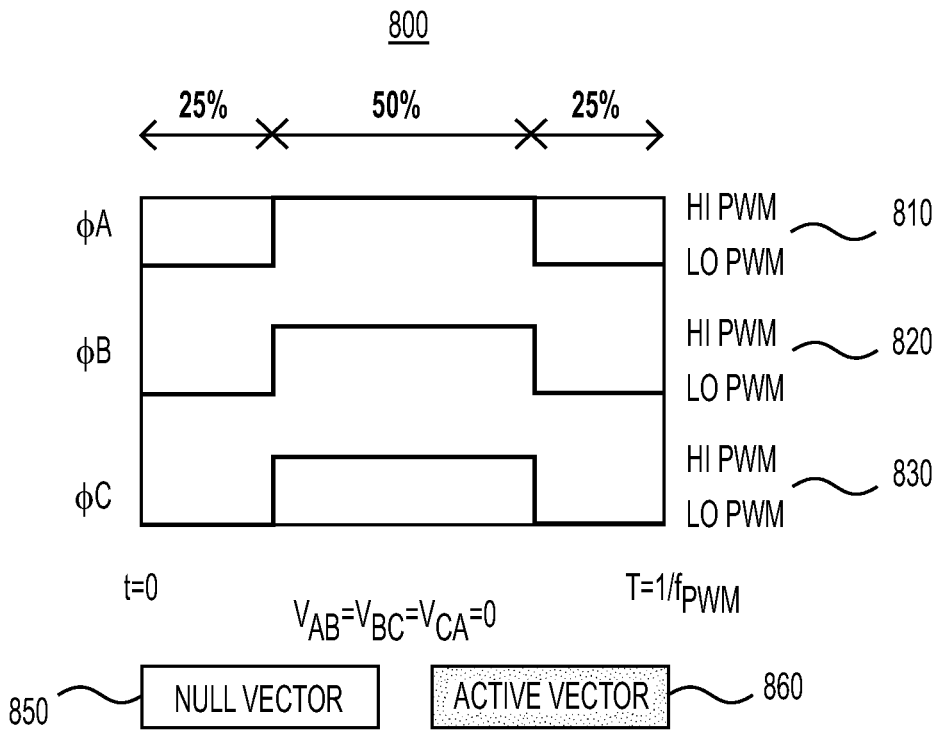
FIG. 8 depicts a period of a PWM scheme with 50% null vector modulation for zero VAC output, according to one or more embodiments.

FIG. 8 depicts a period of a PWM scheme with 50% null vector modulation for zero VAC output, according to one or more embodiments.

As shown in FIG. 8, in the 50% center aligned PWM scheme, all three phases (A, B, and C) are switched during every PWM cycle 800 as illustrated by signals, or pulses 810, 820, and 830. Typically, this PWM scheme applies an equal 50% duty cycle to all three phases (centered in the PWM window) for a 0VAC output. This scheme equally divides the zero/null vector 850 so that both the high side (first three-phase switch group 210) and low side (second three-phase switch group 220) timing is equal. For a 0VAC output from the inverter, there is no active vector 860 in the period 800.

Figure 9:
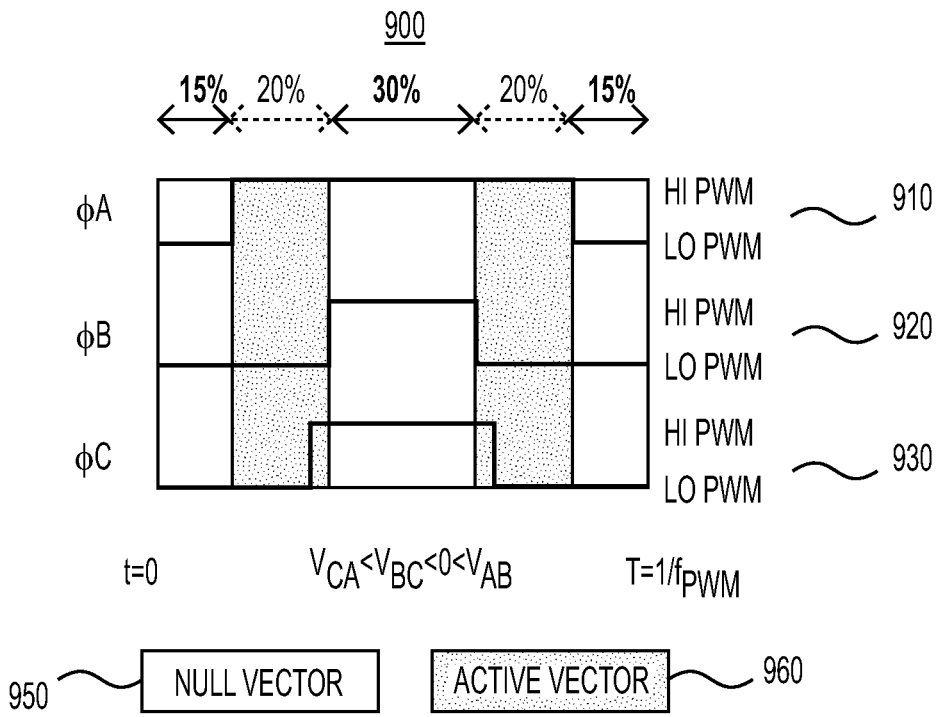
FIG. 9 depicts a period of a PWM scheme with 50% null vector modulation for non-zero VAC output, according to one or more embodiments.

FIG. 9 depicts a period of a PWM scheme with 50% null vector modulation for non-zero VAC output, according to one or more embodiments.

As shown in FIG. 9, to achieve non-zero voltages, the 50% timing is altered across the phases (A, B, and C) to achieve a net active vector/differential voltage on the phases. However, periods of null vector typically still exist and are required in some systems to prevent operation in six step or other over-modulation conditions. The null vector 950 is typically applied such that ½ is at the center and ¼ is at each of the leading and trailing edges of signals 910, 920 and 930, thus centering the PWM scheme.

As shown in FIG. 9, PWM schemes attempt to divide the switching period 900 into periods of "Active Vectors" 960 (also known as "differential Vectors") and "Null Vectors" 950 (also known as "Zero vectors"). The Active vector is divided evenly into two parts (for example, the leading active vector (LAV) is 20% and the trailing active vector (TAV) is 20% in FIG. 9). The remaining time in the PWM period is divided evenly into leading null vector (LNV) (e.g. 15% in FIG. 9), trailing null vector (TNV) (e.g. 15% in FIG. 9), and center aligned null vector (CNV) (e.g. 30% in FIG. 9) periods, so that LAV equals TAV and CNV equals LNV plus TNV. Typically, the current is carried by the low side switches (second three-phase switch group 220) during the leading and trailing periods and by the high side switches (first three-phase switch group 210) during the center aligned period, although nothing precludes the converse condition.

The equal division of the null vector 950 is typically applied (e.g. 30% center null vector is equal to 15% leading plus 15% trailing null vectors or CNV equals LNV plus TNV) due to benefits over much of the operational envelope (particularly at higher revolutions per minute (RPM) or output frequencies). These benefits include lower output/capacitor current ripple (particularly the switching ripple), and allowance for maximum utilization of output voltage. However, in low speed and/or stall conditions, the benefits of maintaining this relationship (CNV equals LNV plus TNV) are marginal. Output voltage needed at stall is traditionally very low owing to low DC impedance of load and lack of back electromotive force (EMF), and capacitor ripple current required at stall is below the maximum value.

Therefore, an additional degree of freedom can be leveraged by removing the requirement to evenly distribute (CNV equals LNV plus TNV) the Null vector 950 at low speed conditions and/or stall, such as below 100 RPM or 50 RPM, for example. This degree of freedom can be used to optimize the system against another performance parameter, such as peak device heat flux in low speed conditions and/or stall.

During low speed conditions and/or stall, if the peak current is being held any one phase (equally divided but opposite sign on the other two phases) the result is the largest conduction and switching losses in that phase. Simultaneously in this condition, one of the switches in the highest loading phase is dissipating the highest switching losses and is also being commanded with the longest duty cycle and therefore the largest conduction losses. An aspect of the present disclosure is to better distribute losses and thereby reduce temperature rate of rise in the devices of the inverter, which leads to an increase in performance.

Figure 10:
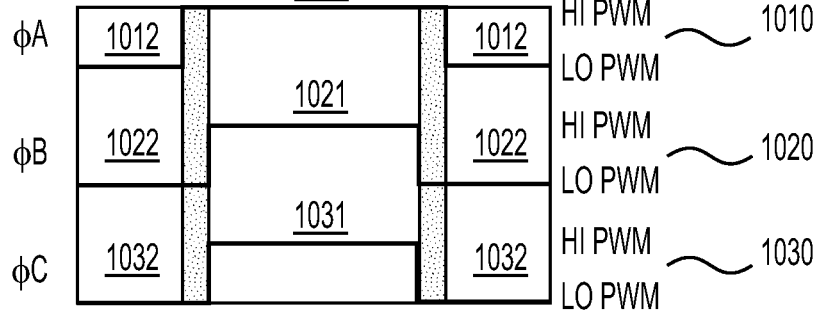
FIG. 10 depicts a period of a stall condition PWM scheme with 50% null vector modulation, according to one or more embodiments.

FIG. 10 depicts a period of a stall condition PWM scheme with 50% null vector modulation, according to one or more embodiments.

As shown in FIG. 10, at stall, the required level of active vector 1060 is typically small, allowing for operation that has a large null vector component 1050. This is due to the low resistance of the motor stator and lack of back EMF at stall. Dynamic effects may require larger active vectors 1060 to create large rates of change in the stator current. As shown in FIG. 10, the active vectors 1060 are provided at 6% on rising and falling edges of the pulses 1010, 1020, and 1030, and the null vectors 1050 are equally distributed at 44% (center) and 44% (22% leading plus 22% trailing).

As such, as shown in FIG. 10, first pulse 1010 of switching period 1000 may include a first duration 1011 where high side (first three-phase switch group 210) switches are activated and a second duration 1012 where low side (second three-phase switch group 220) switches are activated. Second pulse 1020 may include a third duration 1021 where high side (first three-phase switch group 210) switches are activated and a fourth duration 1022 where low side (second three-phase switch group 220) switches are activated. Third pulse 1030 may include a fifth duration 1031 where high side (first three-phase switch group 210) switches are activated and a sixth duration 1032 where low side (second three-phase switch group 220) switches are activated.

In a stall condition PWM scheme with 50% null vector modulation as shown in FIG. 10, within switching period 1000, pulses 1010, 1020, and 1030 are center-aligned at durations 1011, 1021, and 1031, and the second duration 1012 (44%) is equal to the third duration 1021 (44%). Here, a ratio of the second duration 1012 to the third duration 1021 is 1:1.

Figure 11:
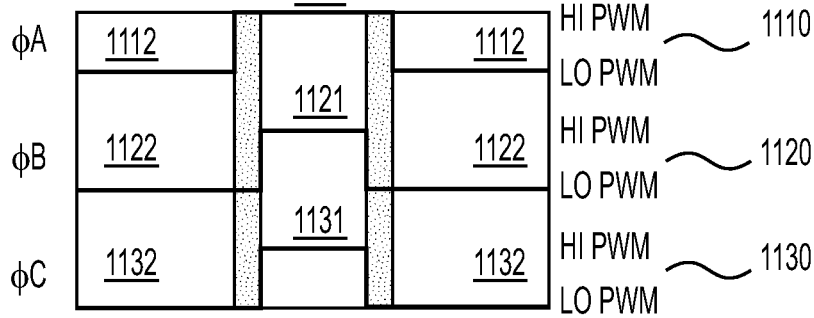
FIG. 11 depicts a period of a stall condition PWM scheme with 25% third harmonic null vector modulation, according to one or more embodiments.

FIG. 11 depicts a period of a stall condition PWM scheme with 25% third harmonic null vector modulation, according to one or more embodiments. As shown in FIG. 11, the active vectors 1160 are provided at 6% on rising and falling edges of the pulses 1110, 1120, and 1130 (similarly to FIG. 10), and the null vectors are differently distributed at 22% (center) and 66% (33% leading plus 33% trailing).

As such, as shown in FIG. 11, first pulse 1110 of switching period 1100 may include a first duration 1111 where high side (first three-phase switch group 210) switches are activated and a second duration 1112 where low side (second three-phase switch group 220) switches are activated. Second pulse 1120 may include a third duration 1121 where high side (first three-phase switch group 210) switches are activated and a fourth duration 1122 where low side (second three-phase switch group 220) switches are activated. Third pulse 1130 may include a fifth duration 1131 where high side (first three-phase switch group 210) switches are activated and a sixth duration 1132 where low side (second three-phase switch group 220) switches are activated.

In a stall condition PWM scheme with 25% third harmonic null vector modulation as shown in FIG. 11, within switching period 1100, pulses 1110, 1120, and 1130 are center-aligned at durations 1111, 1121, and 1131, and the second duration 1112 (66%) is not equal to the third duration 1121 (22%). Here, a ratio of the second duration 1112 to the third duration 1121 is 3:1, but the embodiments are not limited thereto.

Figure 12:
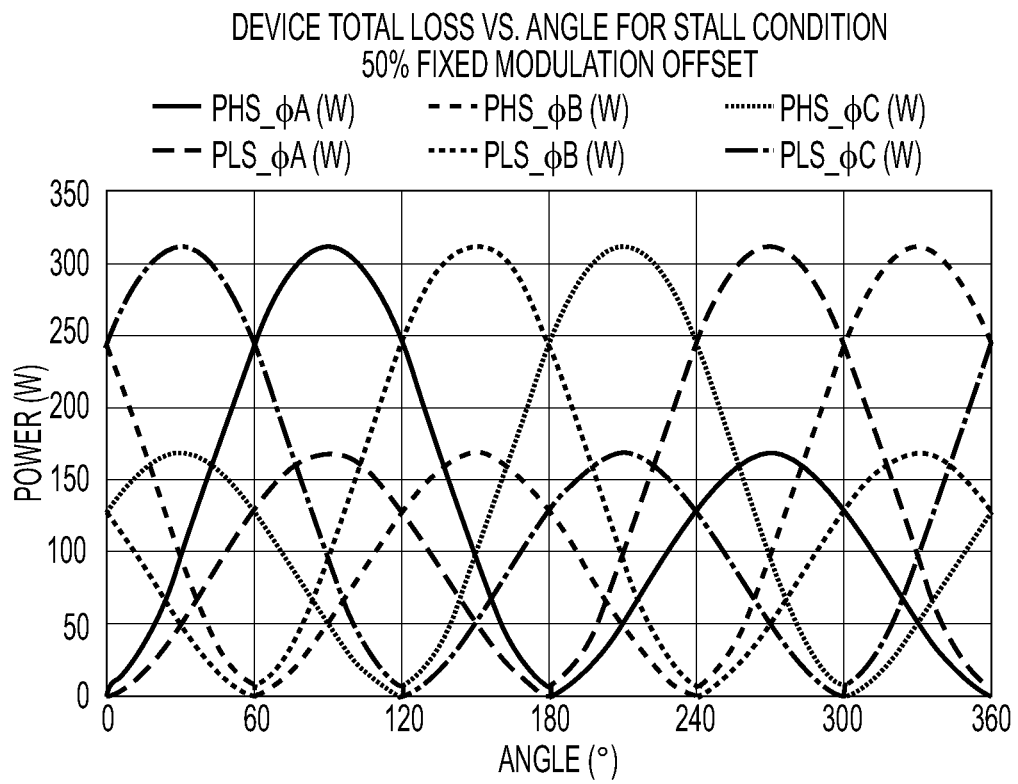
FIG. 12 depicts a device total loss versus angle for a period of a stall condition PWM scheme with 50% null vector modulation, according to one or more embodiments.
Figure 13:
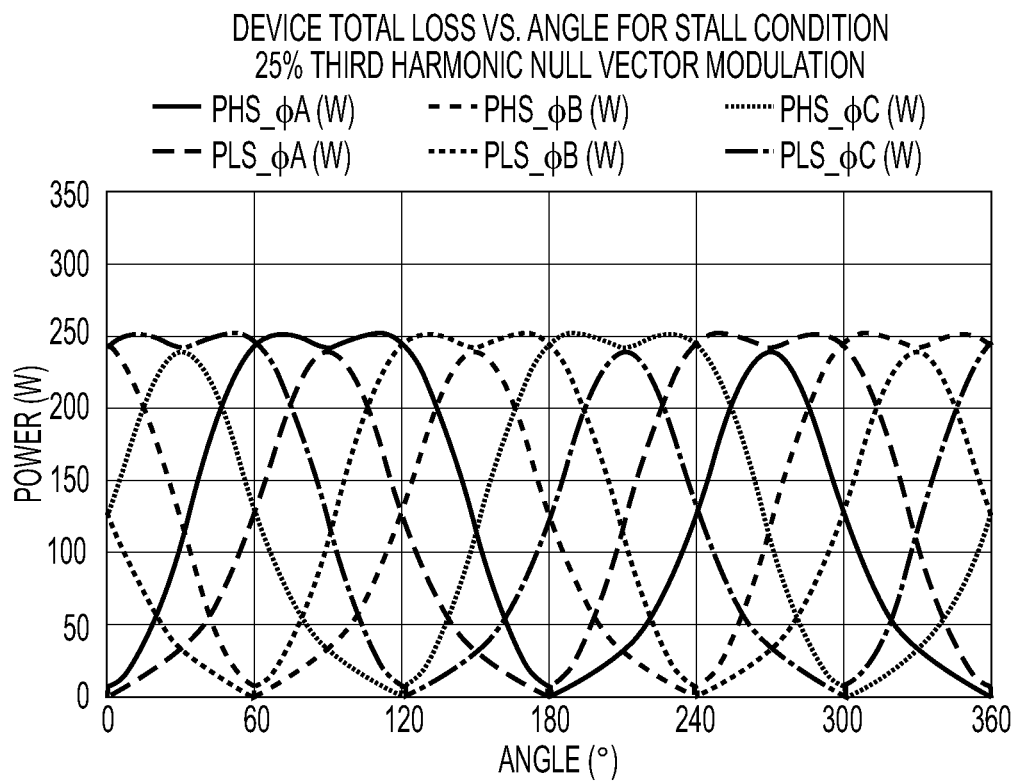
FIG. 13 depicts a device total loss versus angle for a period of a stall condition PWM scheme with 25% third harmonic null vector modulation, according to one or more embodiments.

FIG. 12 depicts a device total loss versus angle for a period of a stall condition PWM scheme with 50% null vector modulation, according to one or more embodiments. FIG. 13 depicts a device total loss versus angle for a period of a stall condition PWM scheme with 25% third harmonic null vector modulation, according to one or more embodiments.

As shown in FIGS. 12 and 13, aspects of the present disclosure provide a third harmonic that hits all six high power points (approximately 310W as illustrated in FIG. 12)

and reduces the peaks so the highest loaded phase has a ⁵⁰⁄₅₀ split of total power between high and low side switches (first three-phase switch group 210 and second three-phase switch group 220, respectively) at the peak. As shown in FIG. 13, the high side switches (first three-phase switch group 210) have the same total losses as the low side switches (second three-phase switch group 220) in highest loaded phase at the peak (approximately 241W in FIG. 13 versus approximately 310W in FIG. 12). Given this scheme, the PWM is not altered (50% average still holds) when two of the phases have equal losses (equal, but opposite current) and the third phase is at a minimum (no output current). Additionally, this scheme provides a minimum amount of increase in loading to the switch that will be the next "highest loaded" switch (avoids pre-heating the next stressed device).

Losses in the inverter are composed of both switching losses and conduction losses. For a metal-oxide-semiconductor field-effect transistor (MOSFET) inverter, the conduction losses are proportional to the device $RDS_{ON}$ (which itself is a function of temperature), phase current, and duty cycle. The switching losses are proportional to the phase current, PWM frequency, and DC link voltage. Additionally, given a direction of phase current, one of the two switches experiences no switching losses at any given non-zero point in the fundamental current waveform due to the load current commutating through the device diodes. This operation is referred to as "soft switching".

The worst case stall point is when the peak current is being held in any one phase, resulting in the largest conduction and switching losses. Simultaneously, in this condition, the switch dissipating the highest switching losses is also being commanded with the longest duty cycle and therefore the largest conduction losses.

Aspects of the present disclosure may alter the typical 50% bias scheme to lower the conduction time for the highest dissipation switch. This may achieve more uniform total losses (and consequentially temperature rise) in both devices of the highest power dissipating switch.

For this PWM scheme, the shift in 50% bias is applied across all three phases. This results in the total time in the active vector remaining unaltered, but a reduction in the conduction time of the highest dissipation switch and a resultant reduction in conduction losses of the highest dissipation switch.

Figure 14:
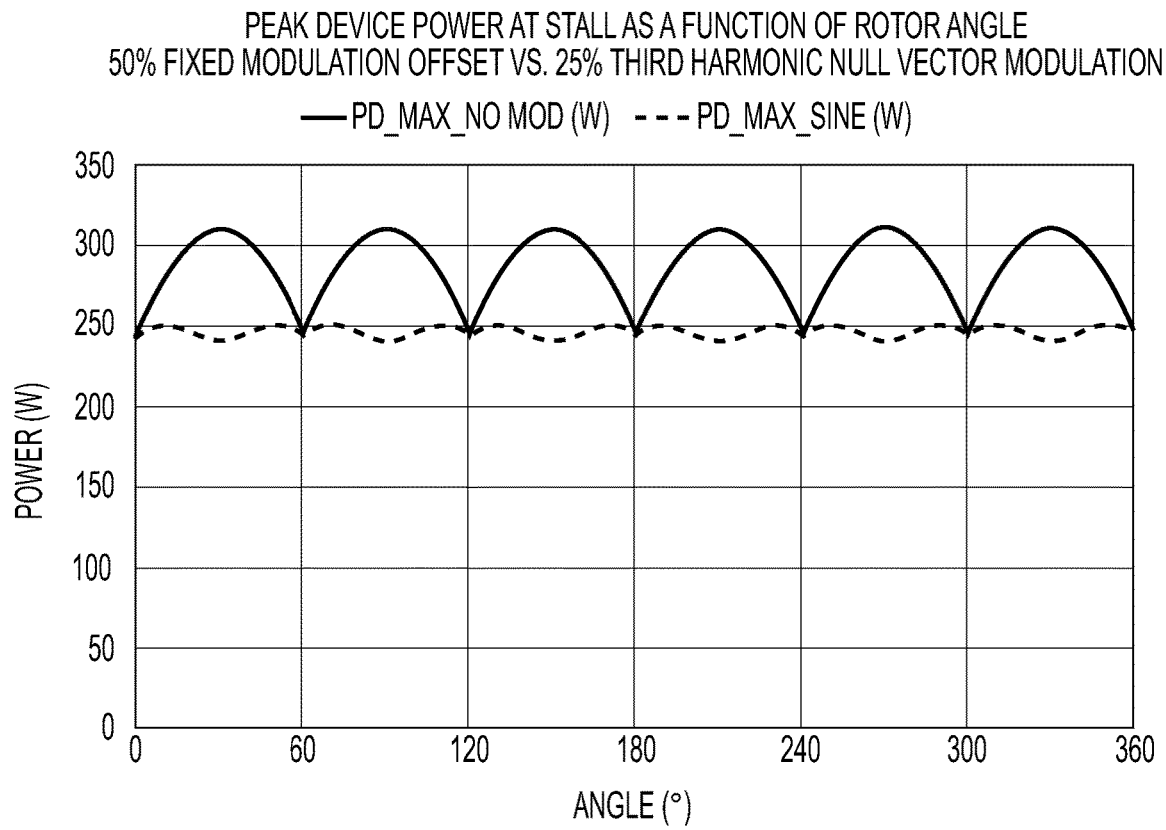
FIG. 14 depicts peak device power at a stall condition as a function of rotor angle for a period of a stall condition PWM scheme with 25% third harmonic null vector modulation compared to a stall condition PWM scheme with 50% null vector modulation, according to one or more embodiments.

FIG. 14 depicts peak device power of the highest loaded device (among both the first three-phase switch group 210 and second three-phase switch group 220) at a stall condition as a function of rotor angle for a stall condition PWM scheme with 25% third harmonic null vector modulation compared to a stall condition PWM scheme with 50% null vector modulation, according to one or more embodiments.

Analyzing the results of losses at stall and comparing the 50% bias scheme to a stall condition PWM scheme with 25% third harmonic null vector modulation shows a reduction in peak heat flux of 22%. The total net losses remained unchanged (again ignoring second order effects of increased losses at higher temperatures).

A comparison of the peak power versus rotor angle for the stall condition PWM scheme with 50% null vector modulation versus a stall condition PWM scheme with 25% third harmonic null vector modulation can be seen in FIG. 14. The data shows the peak power dissipation is reduced by approximately 22% with the injection of an approximate 25% third harmonic into the average duty cycle. Additional improvement in performance may be realized with a more optimized PWM scheme at the cost of increased offset injection wave shape complexity.

In the stall condition PWM scheme with 25% third harmonic null vector modulation, the losses at stall are more symmetric (equal among devices in the inverter) and hence cause more uniform heating, which will avoid damage to the inverter or a reduction in performance. Accordingly, the stall condition PWM scheme with 25% third harmonic null vector modulation does not require temperature measurement of the inverter devices as required by prior methods.

The stall condition PWM scheme with 25% third harmonic null vector modulation does not require measurement of device temperature and reduction of torque (output current) to prevent temperature rise outside of a safe operating area as required by prior methods, and therefore does not result in a decrease in performance.

The stall condition PWM scheme with 25% third harmonic null vector modulation does not require a reduction of output current/torque to decrease power loss as required by prior methods, and therefore does not result in a loss of system performance without regard to true need for reduction. The stall condition PWM scheme with 25% third harmonic null vector modulation does not require implementation of a device junction temperature estimator to attempt to predict the rise in temperature as required by prior methods, and therefore does not result in a decrease in performance.

The stall condition PWM scheme with 25% third harmonic null vector modulation does not require adjusting the PWM scheme by using a Discontinuous PWM/least switch highest current algorithm/Zero Vector select, or by reducing PWM frequency as required by prior methods.

The stall condition PWM scheme with 25% third harmonic null vector modulation does not require altering the fundamental frequency to avoid stall conditions and run at a non-ideal slip speed as required by prior methods, and therefore does not result in reduced torque. The stall condition PWM scheme with 25% third harmonic null vector modulation does not require implementation of a maximum time in stall, after which performance is reduced or operation stopped as required by prior methods, and therefore does not reduce performance to a worst case stall time under all conditions.

Figure 15:
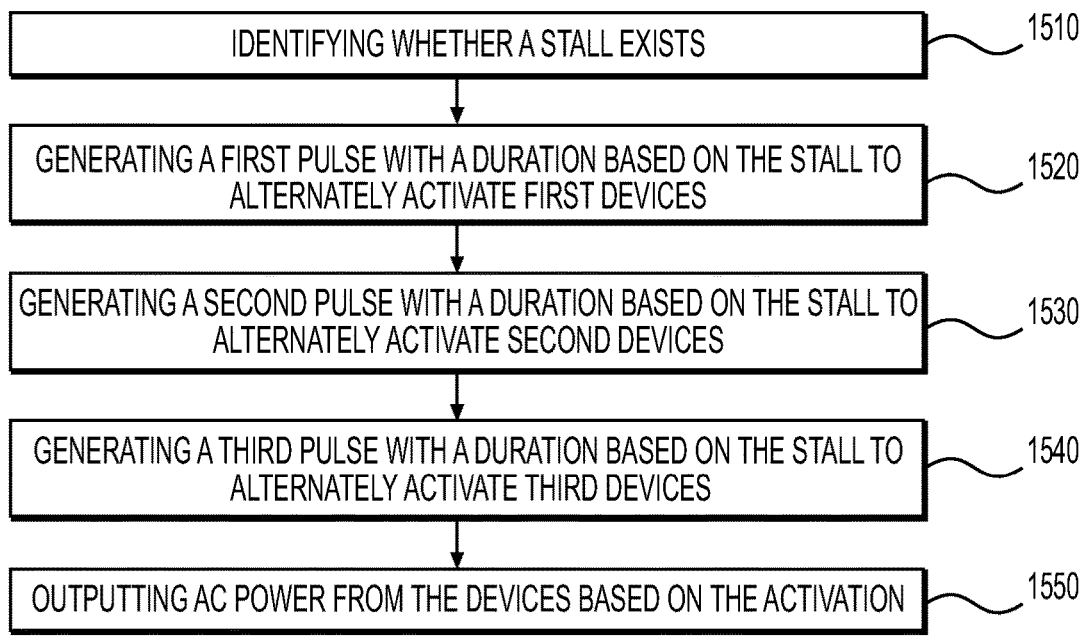
FIG. 15 depicts a flowchart of a method for controlling an inverter, according to one or more embodiments.

FIG. 15 depicts a flowchart of a method for controlling an inverter, according to one or more embodiments. As shown in FIG. 15, inverter controller 300 may perform a method 1500 for controlling an inverter 100.

Inverter controller 300 may identify when a stall condition exists (operation 1510). The stall condition may be identified from a signal provided from motor 290 to inverter controller 300, for example, where the signal indicates an orientation or speed of the motor or that the speed is above or below a threshold speed, but the disclosure is not limited thereto.

Inverter controller 300 may generate a first pulse 1110 for a first phase A of a Pulse-Width Modulated (PWM) signal to alternately activate a first phase switch Q1 of a first switch group 210 of the inverter 100 for a first duration 1111 and a first phase switch Q4 of a second switch group 220 of the inverter 100 for a second duration 1112 within a period 1100 of the PWM signal to generate a first phase U of AC power (operation 1520).

Inverter controller 300 may generate a second pulse 1120 for a second phase B of the PWM signal to alternately activate a second phase switch Q3 of the first switch group 210 of the inverter 100 for a third duration 1121 and a second phase switch Q6 of the second switch group 220 of the inverter 100 for a fourth duration 1122 within the period 1100 of the PWM signal to generate a second phase V of the AC power. The second pulse 1120 may be center-aligned with the first pulse 1110, and the second duration 1112 may be different from the third duration 1121 during a stall condition (operation 1530).

Inverter controller 300 may generate a third pulse 1130 for a third phase C of the PWM signal to alternately activate a third phase switch Q5 of the first switch group 210 of the inverter 100 for a fifth duration 1131 and a third phase switch Q2 of the second switch group 220 of the inverter 100 for a sixth duration 1132 within the period 1100 of the PWM signal to generate a third phase W of the AC power (operation 1540). The third pulse 1130 may be center-aligned with the first pulse 1110 and the second pulse 1120.

Inverter 100 may output the generated AC power to motor 290 (operation 1550).

Inverter controller 300 may generate the first pulse 1110 and the second pulse 1120 based on a non-constant duty cycle bias 500 relative to rotor angle. The non-constant duty cycle bias 500 may be a sinusoidal signal varying from a 25% duty cycle bias to a 75% duty cycle bias relative to the rotor angle. An amplitude of the non-constant duty cycle bias 500 may increase as a rotational speed of a motor 290 driven by the inverter 100 decreases below a threshold speed for the stall condition. For example, at a threshold speed, the non-constant duty cycle bias 500 may be a constant value 50% as indicated by duty cycle bias 400 in FIG. 4. As the speed of the motor variably decreases from the threshold speed to 0 RPM, the amplitude of the non-constant duty cycle bias 500 may variably increase using a linear or exponential function, for example, from the constant value 50% as indicated by duty cycle bias 400 in FIG. 4 to the non-constant duty cycle bias 500 as a sinusoidal signal varying from a 25% duty cycle bias to a 75% duty cycle bias relative to the rotor angle in FIG. 5. As the amplitude of the non-constant duty cycle bias 500 variably increases, this provides a corresponding variable decrease in the width of the center-aligned null vector as represented by third duration 1121 (see FIG. 11) from, for example, 44% as shown in third duration 1021 in FIGS. 10 to 22% as shown in third duration 1121 in FIG. 11. The threshold speed for a low speed and/or stall condition may be 100 RPM or 50 RPM, for example, but the embodiments are not limited thereto, and the threshold speed may be determined based on a particular motor/inverter application.

The second duration 1112 being different from the third duration 1121 may reduce a maximum heat flux during the stall condition in any switch among the first switch group 210 of the inverter 100 and the second switch group 220 of the inverter 100, relative to a condition where the second duration 1012 equals the third duration 1021 in a PWM scheme with 50% null vector modulation, by tailored PWM switching to better distribute conduction losses in the inverter devices to lower the overall maximum heat flux in the highest loaded inverter devices, which leads to an increase in performance of the inverter.

The second duration 1112 may be different from the third duration 1121 during the stall condition (e.g. see FIG. 11), and the second duration 1112 may be equal to the third duration 1121 outside the stall condition (e.g. see FIGS. 9 and 10). The first pulse 1110 and the second pulse 1120 may define an active vector 1160 and a null vector 1150 for the PWM signal, a duration of the active vector 1160 may remain constant regardless of the stall condition, and a duration of the null vector 1150 may change during the stall condition.

Figure 16:
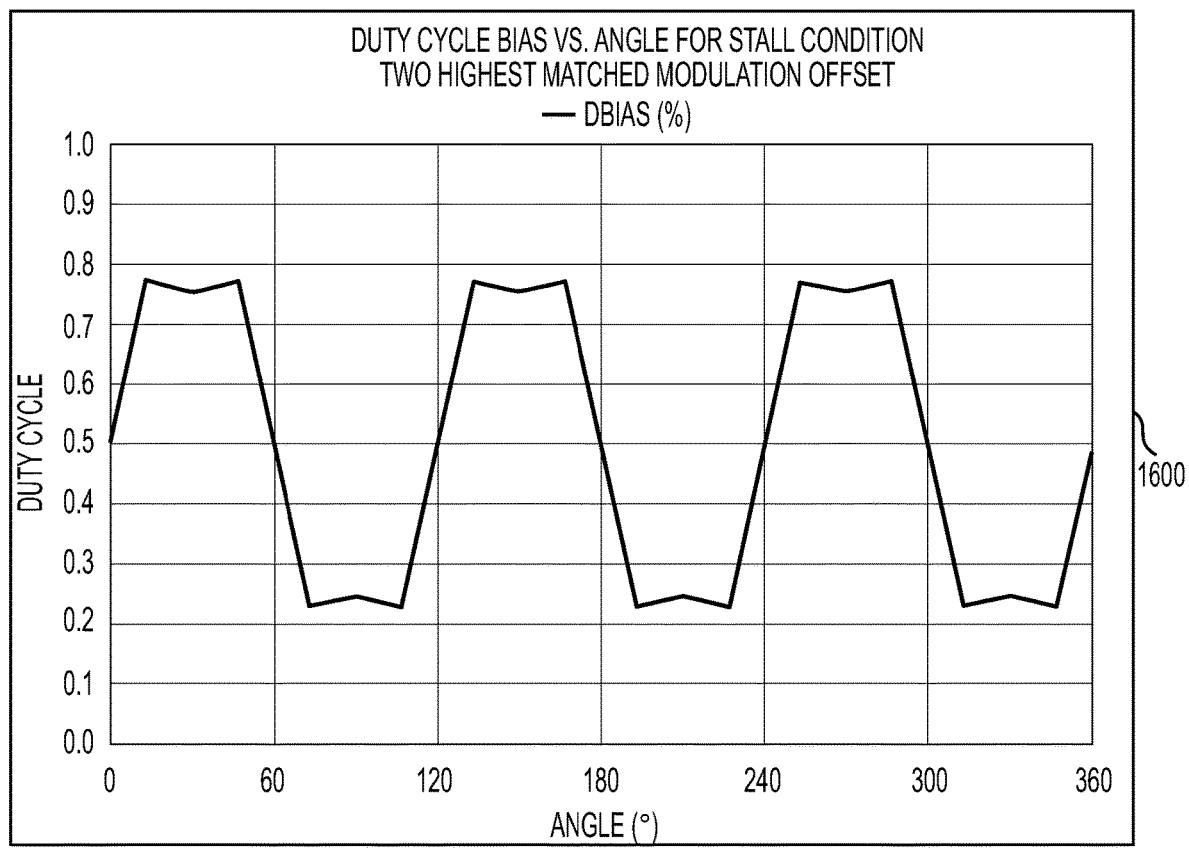
FIG. 16 depicts a duty cycle bias versus angle for a period of a stall condition PWM scheme with two highest matched modulation offset, according to one or more embodiments.

FIG. 16 depicts a duty cycle bias versus angle for a period of a stall condition PWM scheme with a two highest loaded devices always equal, according to one or more embodiments. As shown in FIG. 16, the duty cycle bias 1600 for a stall condition PWM scheme with two highest loaded devices always equal varies from approximately 22.8% to approximately 77.2% in an approximately sinusoidal waveform as an angle varies from 0 degrees to 360 degrees. However, the disclosure is not limited to the waveforms illustrated in FIGS. 5 and 16, which are merely examples, and other variable waveforms (particularly tailored to the targeted system) may be used to vary the duty cycle bias as an angle varies from 0 degrees to 360 degrees.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system including a controller for a direct-current (DC) to alternating current (AC) inverter, the controller comprising:
   a memory configured to store instructions; and
   at least one processor configured to execute the stored instructions to perform operations including:
      generating a first pulse for a first phase of a Pulse-Width Modulated (PWM) signal to alternately activate a first phase switch of a first switch group of the inverter for a first duration and a first phase switch of a second switch group of the inverter for a second duration within a period of the PWM signal to generate a first phase of AC power; and
      generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power,
      wherein the second pulse is center-aligned with the first pulse, and
      wherein the second duration is different from the third duration during a stall condition.

2. The system of claim 1, the operations further including:
   generating a third pulse for a third phase of the PWM signal to alternately activate a third phase switch of the first switch group of the inverter for a fifth duration and a third phase switch of the second switch group of the inverter for a sixth duration within the period of the PWM signal to generate a third phase of the AC power,
   wherein the third pulse is center-aligned with the first pulse and the second pulse.

3. The system of claim 1, wherein the generating the first pulse and the second pulse is based on a non-constant duty cycle bias relative to phase angle.

4. The system of claim 3, wherein the non-constant duty cycle bias is a sinusoidal signal varying from a 25% duty cycle bias to a 75% duty cycle bias relative to the phase angle.

5. The system of claim 3, wherein an amplitude of the non-constant duty cycle bias increases as a rotational speed of a motor driven by the inverter decreases below a threshold speed for the stall condition.

6. The system of claim 1, wherein the second duration being different from the third duration reduces a maximum heat flux during the stall condition in any switch among the first switch group of the inverter and the second switch group of the inverter, relative to a condition where the second duration equals the third duration in a PWM scheme with 50% null vector modulation.

7. The system of claim 1, wherein
the second duration is different from the third duration during the stall condition, and
the second duration is equal to the third duration outside the stall condition.

8. The system of claim 7, wherein
the first pulse and the second pulse define an active vector and a null vector for the PWM signal,
a duration of the active vector remains constant regardless of the stall condition, and
a duration of the null vector changes during the stall condition.

9. The system of claim 1, further comprising:
the inverter;
a set of input terminals configured to receive DC power;
the first switch group including the first phase switch and the second phase switch configured to receive the first phase of the PWM signal to generate the first phase of the AC power;
the second switch group including the first phase switch and the second phase switch configured to receive the second phase of the PWM signal to generate the second phase of the AC power; and
a set of output terminals configured to output the generated first phase of the AC power and the second phase of the AC power,
wherein the controller is configured to generate the PWM signal to operate the first switch group and the second switch group.

10. The system of claim 9,
wherein the inverter is configured to receive the DC power and generate the AC power; and
the system further comprises:
a motor configured to receive the generated AC power from the inverter, and to rotate based on the received AC power.

11. A method for controlling a direct-current (DC) to alternating current (AC) inverter, the method comprising performing, by at least one processor, operations including:
generating a first pulse for a first phase of a Pulse-Width Modulated (PWM) signal to alternately activate a first phase switch of a first switch group of the inverter for a first duration and a first phase switch of a second switch group of the inverter for a second duration within a period of the PWM signal to generate a first phase of AC power; and
generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power,
wherein the second pulse is center-aligned with the first pulse, and
wherein the second duration is different from the third duration during a stall condition.

12. The method of claim 11, further comprising:
generating a third pulse for a third phase of the PWM signal to alternately activate a third phase switch of the first switch group of the inverter for a fifth duration and a third phase switch of the second switch group of the inverter for a sixth duration within the period of the PWM signal to generate a third phase of the AC power,
wherein the third pulse is center-aligned with the first pulse and the second pulse.

13. The method of claim 11, wherein the generating the first pulse and the second pulse is based on a non-constant duty cycle bias relative to phase angle.

14. The method of claim 13, wherein the non-constant duty cycle bias is a sinusoidal signal varying from a 25% duty cycle bias to a 75% duty cycle bias relative to the phase angle.

15. The method of claim 13, wherein an amplitude of the non-constant duty cycle bias increases as a rotational speed of a motor driven by the inverter decreases below a threshold speed for the stall condition.

16. The method of claim 11, wherein the second duration being different from the third duration reduces a maximum heat flux during the stall condition in any switch among the first switch group of the inverter and the second switch group of the inverter, relative to a condition where the second duration equals the third duration in a PWM scheme with 50% null vector modulation.

17. The method of claim 11, wherein
the second duration is different from the third duration during the stall condition, and
the second duration is equal to the third duration outside the stall condition.

18. The method of claim 17, wherein
the first pulse and the second pulse define an active vector and a null vector for the PWM signal,
a duration of the active vector remains constant regardless of the stall condition, and
a duration of the null vector changes during the stall condition.

19. The method of claim 11, further comprising:
outputting the generated first phase of the AC power and the second phase of the AC power from the inverter.

20. A non-transitory computer readable medium storing instructions that, when executed by at least one processor, perform operations including:
generating a first pulse for a first phase of a Pulse-Width Modulated (PWM) signal to alternately activate a first phase switch of a first switch group of an inverter for a first duration and a first phase switch of a second switch group of the inverter for a second duration within a period of the PWM signal to generate a first phase of AC power; and
generating a second pulse for a second phase of the PWM signal to alternately activate a second phase switch of the first switch group of the inverter for a third duration and a second phase switch of the second switch group of the inverter for a fourth duration within the period of the PWM signal to generate a second phase of the AC power,
wherein the second pulse is center-aligned with the first pulse, and
wherein the second duration is different from the third duration during a stall condition.

* * * * *